G. W. Packer, Jr.

Stamp Elevator.

No. 3,022. Reissued July 7 1868.

Witnesses:
Thomas D. Stetson
Hambleton W. Stetson

Inventor:
Geo. W. Packer Jr.

N. PETERS, PHOTO-LITHOGRAPHER, WASHINGTON, D. C.

United States Patent Office.

GEORGE W. PACKER, JR., OF MYSTIC RIVER, CONNECTICUT.

*Letters Patent No.* 49,647, *dated August* 29, 1865; *reissue No.* 3,022, *dated July* 7, 1868.

IMPROVED APPARATUS FOR BUILDING WALLS AND EXTRACTING STUMPS.

The Schedule referred to in these Letters Patent and making part of the same.

TO ALL WHOM IT MAY CONCERN:

Be it known that I, GEORGE W. PACKER, Jr., of Mystic River, in the county of New London, and State of Connecticut, have invented certain new and useful Improvements in Wall-Builders and Stump-Extractors; and I do hereby declare that the following is a full and exact description thereof.

The accompanying drawings form a part of this specification.

Figure 3:
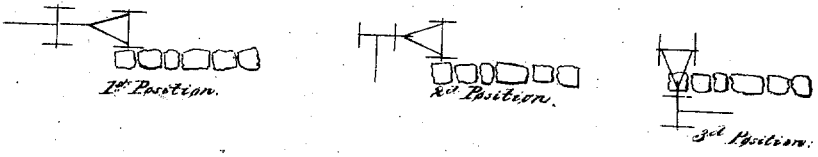

Figure 3 indicates, on a smaller scale, in plan, the movements of the structure in properly operating it. The three diagrams indicate the changes in position; the first, the halt alongside the end of the wall or fence on which the stone or stump is to be deposited; the second, the turned position of the team, and the third and final position, the team having turned the entire structure into the position for depositing the load in the wall, either at the top or bottom, as may be required.

Figure 1:
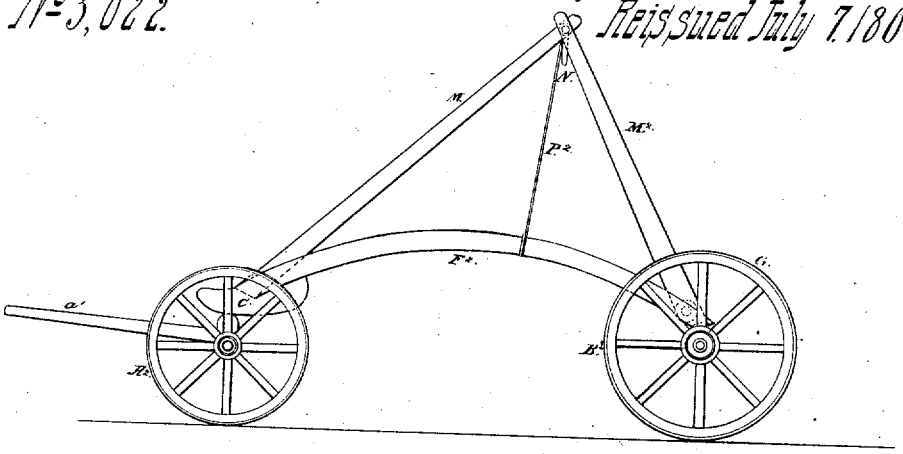
Figure 1 is a side elevation of my machine.
Figure 4:
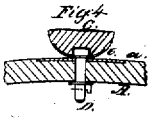
Figure 2:
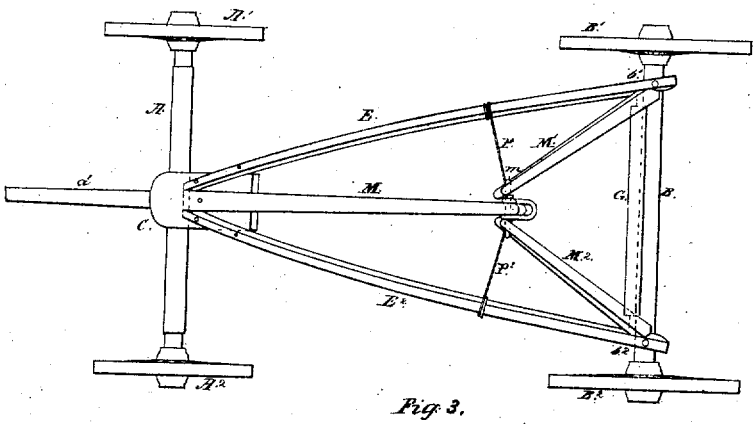
Figure 2 is a plan view.

Figure 4 is a vertical section of the rocker, in the plane of the forward axle.

Similar letters of reference indicate corresponding parts in all the figures.

My invention relates to the construction and arrangement of the parts of the carriage for this and analogous uses.

My carriage is a stout triangular pyramidal truss, supported on four wheels, and suspending the stone or other load from the apex or upper angle of the pyramid. Its four wheels give the structure very obvious advantages over any analogous truss supported on two wheels, and its character as a truss, having inclined struts to transfer the weight to the wheels, and ties across to prevent their spreading, gives it very distinct advantages over the trucks or wagons, of whatever names, in which the weight is carried on a simple beam or brest-summer supported at a high level.

An important feature of my apparatus lies in the form of the ties which extend across and are subjected to a tensile strain when the device is loaded. I give these a greatly curved or arched form, by selecting for the purpose naturally curved pieces of oak or other suitable wood, or by applying together and bolting through properly cut pieces of stiff stuff. The rigidity of the stuff enables it to resist a very great pull without straightening, and the arched form allows me to swing a bulky stone or stump beneath them, and to place it on the top of a wall or the like, while the base of the truss is down on or near the axles.

In order to reduce the disposition of my arching ties or reaches to straighten under loads, I introduce braces or ties, connecting the high portion of the curve to the apex or some connected part of the triangle or pyramid above.

In order to accommodate the carriage to very great roughness or inequalities in the surface on which it operates, and give it at the same time sufficient stiffness to properly support a great load depending from the apex of the triangle, I spread my triangle sidewise at the rear end, so as to occupy the whole available width of the hind axle, but concentrate it on the centre of the forward axle, and rest it there on a round-bottomed rocker, which is held in position on the axle by a king-bolt, having a universal joint in close proximity to the upper surface of the forward axle.

The result of the whole is a simple and remarkably strong and durable machine, admirably adapted for agricultural districts, capable of being constructed and operated with little skill and expense, and of being used in rocky and stumpy situations with impunity. Its front wheels prevent the load from crushing or choking the cattle in descending and ascending steep places. The wideness of the space, or great length between the front and hind wheels, allow it to be turned and hauled so as to lower stones on a wide wall or into a wide cavity directly from my truss.

To enable others skilled in the art to make and use my invention, I will proceed to describe its construction and operation, by the aid of the drawings and of the letters of reference marked thereon.

A is the forward axle; $A^1$ $A^2$, the forward wheels; and *a*, the rocker-plate; B is the hind axle; $B^1$ $B^2$, the hind wheels; and $b^1$ $b^2$, the stout bolts which confine the curved reaches; C is a stout block of hard wood, with a rounded or spherical base, which serves as a rocker, and $c$ is a correspondingly-shaped plate of iron, bolted on the under side, to confine the head of the king-bolt D, and allow the rocker C to vibrate or roll in all directions on the plates $c$ and $a$, as will be obvious, while the loose connection of the king-bolt D allows it to securely hold the parts together, while they are free to turn in all directions in the manner of a universal joint.

$E^1$ and $E^2$ are stout curved reaches, bolted at their front ends to the rocker C, and at their rear ends to the hind axle B. The form of the cross-section is rectangular, and the depth is considerably greater than the width, so as to give great strength to resist a tensile and straightening force with little unnecessary weight.

M, $M^1$, and $M^2$ are stout timber pieces, which form a triangular pyramid or pyramidal truss, resting on the front and rear axles in the manner represented.

The front timber, M, rests on the rocker C, and is bolted thereto. The rear timbers, $M^1$ and $M^2$, rest on the rear axle, and are bolted thereto near the ends thereof, as indicated. The upper ends of these timbers are strongly connected by a bolt, $m$, from which depends the clevis N, adapted to support a hydraulic jack or other power for raising the weight.

G is a windlass, carried in bearings near the feet of the timbers $M^1$ and $M^2$, and turned and connected in any ordinary manner, not represented, in order to operate a suitable rope or chain through pulleys, not represented, depending from the clevis N.

$P^1$ $P^2$ are tie-rods, connecting the crown or belly of the curve of the several reaches $E^1$ $E^2$ with the bolt $m$.

The effects of the strain on my structure are analogous to those on common trusses. The load on the summit of the pyramid tends to widen the base, and the tie or reach tends to resist it by its tensile strength. In other words, the strain on the reaches $E^1$ and $E^2$ is tensile, and this tends to straighten them. The braces $P^1$ $P^2$, connecting the curved reaches with the apex of the pyramid, aid in maintaining the curvature of the reaches, and thus stiffen and strengthen the structure.

In the use of my apparatus, the cattle are attached to the tongue $a$, and the whole is drawn alongside of the stone or other object to be lifted, and then turned and hauled around, to bring the apex of the truss directly over it. Then a suitable sling or other attachment being employed, the stone is lifted clear of the ground, and its whole weight supported on the clevis N. In this condition the strain on all the parts is severe, but not in excess of their capacity to resist. The strain on the timbers M $M^1$ $M^2$ is crushing, that on the reaches $E^1$ $E^2$ is tensile and straightening or transverse, that on the upright ties $P^1$ $P^2$, between the reaches and the top of the pyramid, is tensile, while that on the rocker, axles, and wheels, is of the well-known and ordinary characters, the peculiar service or function of the spherical-based rocker being only performed on very uneven ground, supposed not now present.

In this condition the cattle are turned properly, and the load moved off alongside of the place where the stone is to be deposited, where it is again turned and hauled around until the stone is directly over the bed on which it is to lie, and there lowered and released. The team is then turned around and the apparatus removed by a reversal of the movements described.

It will be evident that this mode of operating allows the piling of one stone or mass upon another, so as to build walls of any height less than that of the highest part of the arching-ties $E^1$ $E^2$.

I believe this result has never been before accomplished with so little labor.

Having now fully described my invention, what I claim as new, and desire to secure by Letters Patent, is as follows:

1. The within-described combination and arrangement of the pyramidal frame M $M^1$ $M^2$, and curved reaches $E^1$ $E^2$, with the four wheels and their accessories, substantially as and for the purposes set forth.

2. The employment of braces $P^1$ $P^2$, in combination with the struts M, &c., and the curved reaches $E^1$ $E^2$, and arranged to be supported on wheels, substantially in the manner described, so that the braces shall aid in maintaining the curvature or arching condition of the reaches by connecting each to the struts above at one or more points, as and for the purpose herein set forth.

3. The spherical-based rocker C, having the king-bolt D connected thereto by a loose joint, as represented, in combination with a trussed frame, M, &c., and with the wheels, substantially as and for the purposes herein set forth.

GEORGE W. PACKER, JR.

Witnesses:

C. C. LIVINGS,

W. C. DEY.